United States Patent [19]

Yablonski et al.

[11] Patent Number: 4,825,303

[45] Date of Patent: Apr. 25, 1989

[54] COMPRESSED AUDIO SILENCING

[75] Inventors: Robert E. Yablonski, Irvine; John A. Roe, Orange, both of Calif.

[73] Assignee: EECO Incorporated, Irvine, Calif.

[21] Appl. No.: 52,169

[22] Filed: May 18, 1987

Related U.S. Application Data

[63] Continuation of Ser. No. 621,387, Jun. 18, 1984, abandoned.

[51] Int. Cl.$^4$ .............................................. H04N 5/76
[52] U.S. Cl. .................................. 358/335; 358/341; 358/343; 358/143; 360/8; 360/19.1; 360/9.1
[58] Field of Search ................. 360/8, 9.1, 32, 27, 360/19.1, 33.1; 358/143, 335, 343, 341; 381/94, 29, 31, 34

[56] References Cited

U.S. PATENT DOCUMENTS

| | | | |
|---|---|---|---|
| 3,872,503 | 3/1975 | Shutterly | 360/8 |
| 4,022,986 | 5/1977 | Teer | 360/32 |
| 4,030,129 | 6/1977 | Whitlock | 360/32 |
| 4,141,039 | 2/1979 | Yamamoto | 360/8 |
| 4,429,332 | 1/1984 | Pargee | 358/134 |
| 4,463,387 | 7/1984 | Hashimoto | 360/32 |
| 4,549,229 | 10/1985 | Nakano | 360/8 |

Primary Examiner—Robert L. Richardson
Attorney, Agent, or Firm—Knobbe, Martens, Olson & Bear

[57] ABSTRACT

A method and apparatus for suppressing spurious audio frequency sounds in a system in which electrically represented audio frequency sounds are very significantly raised in frequency and are conformed to a video line signal format. A sufficient number of guard samples ("M") are included at the beginning of each line of electrically represented audio frequency sounds to allow the amplitude response of the video line signal to reach the specified value prior to the occurrence of the samples that are used. The additional guard samples are provided by RAM memory (3), which is controlled by state machine (4). Fewer additional guard samples ("K") may be provided at the end of a video line to enhance tolerance to small timing variations. This method and apparatus allows satisfactory functioning with apparatus having a limited range of frequency response and without precise timing adjustment of video information signals in relationship to the line of synchronizing signal, thus being less costly to manufacture and use.

7 Claims, 1 Drawing Sheet

COMPRESSED AUDIO SILENCING

This application is a continuation, of application Ser. No. 621,387, filed 6/18/84, and now abandoned.

TECHNICAL FIELD

This invention pertains to the modification of a television compressed audio signal to retain its fidelity despite limited frequency response of the apparatus utilized and imprecise timing of the video information signal in relation to the line synchronizing signal.

BACKGROUND ART

U.S. Pat. No. 4,429,332, of Jan. 31, 1984, to Robt. Pargee, Jr., "TELEVISION COMPRESSED AUDIO", discloses the essential method and means of impressing sound electrical variations at, say, 400 times faster upon a video waveform than the frequency of the audio electrical variations involved. A reverse process recovers the electrical variations at the normal audio frequency. Unless apparatus having high fidelity is used and the video waveforms are reproduced without distortion, spurious sounds will occur in the useful output that are related to the processing employed.

SUMMARY OF THE INVENTION

Audio frequency sound information is sampled and enters a RAM memory at a continuous audio frequency rate. This information is read out of that memory at video rate, with cessation of readout for insertion of video line synchronizing signals. A state machine controls memory readout to/output plural samples of identical video amplitude; i.e., guard samples prior to and of equal amplitude to the first used sample on each video line, such as 8 guard samples. This allows apparatus of limited frequency response to function with the above total signal without producing spurious audio sounds from line synchronizing interruption effects. Apparatus of limited frequency response is typically offered for sale in the technical marketplace. The additional guard samples allows the amplitude response of the apparatus of limited frequency response to reach the intended amplitude by the time that the signal is to be used.

At the end of each video line, subsequent to the last used sample, additional samples of equal amplitude to the last sample are outputted to provide timing leeway between the last used sample and the start of the next line synchronizing signal. Typically, these may be two guard samples. The guard samples at the end of the video line in combination with the guard samples at the start of the line allow typical video processing operations, such as timebase correctors and processing amplifiers, to change the timing of video information relative to line synchronizing signals without introducing spurious audio frequency sounds.

BEST MODE OF CARRYING OUT THE INVENTION

Figure 1:
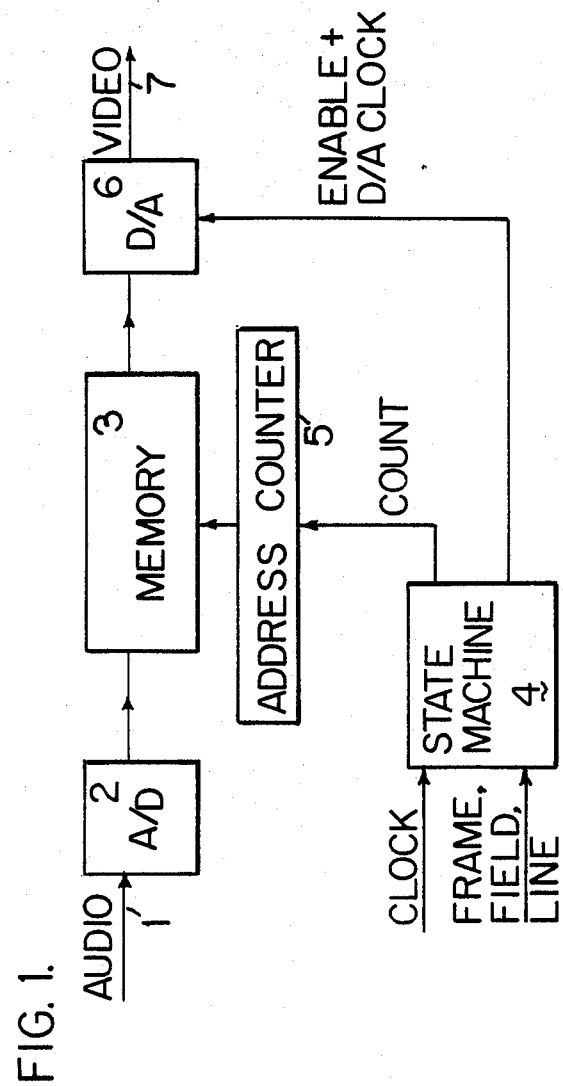
FIG. 1 is a block diagram of the apparatus.

In FIG. 1 an audio frequency electrical signal from a source not shown enters the present system at arrow 1. This may originate from a microphone, from a previously recorded audio tape, an audio or audio-video tape or disk, or similar known sources. This signal enters analog to digital converter 2, which may be a type AD574AJD device. The output therefrom enters memory 3, which is preferably of the random access type (RAM), and typically in an uninterrupted stream.

State machine 4 exercises control over this group of apparatus. State machine 4 is available in an integrated circuit, 82S105. As supplied, it acts on essentially every state. This performance is altered to act on only such states as the circuit designer desires by purposely blowing the fuses that connect the circuits the designer does not want to use.

The output of the state machine controls memory access through address counter 5, which counts sequentially while outputting samples on a video line. This counting is interrupted by the state machine to allow insertion of line synchronizing signals in the video signal. Counting is further interrupted to cause the first "M" samples on a line to be read from the same memory location and therefore have the same value as the "M+1st" sample.

A typical arrangement is to place 210 samples per video horizontal scanning line at a sample rate of 4.185 mega-hertz, (MHZ).

This is accomplished by state machine 4, which receives as inputs an 8.370 MHZ clock, and video line, field and frame sync signals. The 8.370 MHZ clock is synchronized to the video line frequency, so exactly 532 cycles match one video line. The state machine is initialized by line sync and allocates a number of clock cycles for the sync interval. Subsequent to that interval the state machine enables D/A converter 6 to output "M" guard samples from the memory address location, which contains the first used sample. Each sample duration is equal to two cycles of the 8.370 MHZ clock. (Sample rate=4.185 MHZ). After the guard samples and the first used sample have been outputted, the state machine applies a 4.185 MHZ count signal to address-counter 5. Each subsequent sample is obtained from consecutive sequential memory address locations until a total of 210 samples have been counted. Subsequent to the 210 samples that are used, "K" additional guard samples are outputted by halting the count signal while continuing the D/A conversion for "2K" more cycles of the 8.370 MHZ clock. After this has been concluded the state machine turns OFF the D/A enable and waits for the next line synchronizing signal to restart the sequence.

Figure 2:
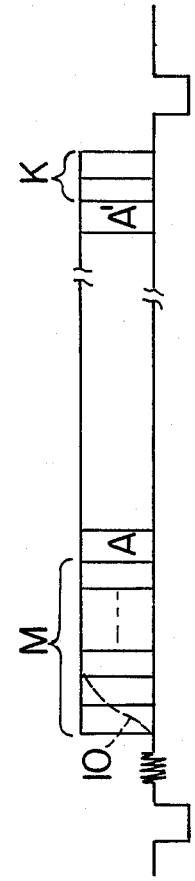
FIG. 2 is a waveform diagram of one video line, indicating the functioning of the apparatus of FIG. 1.

Analog information leaves digital to analog converter 6 as video frequency information at 7 from a digital input from memory 3 and enablement from state machine 4. This includes the guard samples occurring after the synchronizing interval and the video information along the line. The guard samples are "M" and "K" in FIG. 2; eight and two such samples, respectively, being one choice according to this invention. Dotted line 10 in FIG. 2 indicates how the amplitude response of particularly reproducing equipment follows a delay curve up to the steady state amplitude because of a limited range of frequency response, rather than responding vertically upward at once as shown in the full lines in FIG. 2. Such prompt response can be hand in recording and reproducing equipment only by having a very wide bandwidth of frequency response.

However, with the additional initial samples "M" the amplitude response rises to the valid value prior to use, and such apparatus gives transient-free response that is the equivalent of reproducing equipment of very wide bandwidth.

It will be noted that the inadequate performance of the typical reproducing equipment is overcome at the recording equipment by the addition of the "M" samples. The cure is inherent with the signal format and does not require any adjustment upon reproducing the program material.

In the normal processing of video signals for editing or for transferring from one recording medium to another, typically time-base correctors and video processor amplifiers re-insert new sync signals to assure conformance to television waveform format specifications. The inserted sync signals typically differ slightly in timing in relation to the samples on a video line as compared to the original sync signals. This is within the limits of television specifications, but may exceed the width of a sample.

Without "M" guard bits at the start and "K" guard bits at the end of a line, the shifted sample timing resulting from typical video processing may result in a spurious audio signal when recovering the original audio.

The recovery process utilizes a 4.185 MHZ sampling clock, which is synchronized by the video line sync signal. After delaying an appropriate number of cycles for the synchronizing interval the sampling begins at the nominal time-center of the first sample on the line. If the sample video has been shifted by more than one-half sample interval (119 nanoseconds) the first recovery sample will occur in the line sync interval "back porch" or "front porch" areas. Rather than sampling the compressed audio signal the recovery process will be sampling video black, which is a full scale audio value. This introduces a recovery error which results in a spurious audio buzz.

Addition of the "M" guard samples at the start of the video line and the "K" guard samples at the end of the line during the formation of the video signal reduces the succeptability to line time-shifts as described above. The tolerance will be increased by "K" or "M" sample intervals, whichever is smaller. When K=2 and M=8, as described above, the increase is 478 nanoseconds.

The guard samples may alternatively be other amplitude values, as for example, a video gray level half-way between black and white, or calculated values as the average of the last and first used samples bordering the line sync interval.

These alternative sample values require the assignment of additional memory locations to store them and additional state machine sequence states to access them when they are to be used. The required apparatus changes are direct extensions of the memory and the state machine designs.

The calculations can be performed by a microprocessor after the original audio is stored in RAM memory and before conversion to video. The length of time required for calculation is not a problem, since it is not performed at video speed.

The calculated guard sample values can be mathematically derived from the last and first samples bordering the line sync interval and from pre-emphasis required to compensate for the video recording and reproducing system risetime.

What is claimed is:

1. The method of operating a television-compressed-audio sound system in which electrical amplitude variation samples that originally represented sound are raised in frequency and are altered to a video signal format, which includes the method step of:
   (a) adding a guard sample prior to the samples that are utilized on each video line of compressed audio to allow the amplitude of the signal to reach a steady state value by the time said samples are received and so avoid television-line-transient-produced spurious audio sounds, wherein said guard sample is equal in amplitude to a gray level half-way between black and white.

2. The method of operating a television-compressed-audio sound system including a recording and playback system in which electrical amplitude variation samples that originally represented sound are raised in frequency and are altered to a video signal format, which includes the steps of:
   (a) adding a guard sample prior to the samples that are utilized on each video line of compressed audio to allow the amplitude of the signal to reach a steady state value by the time said samples are received and so avoid television-line-transient-produced spurious audio sounds; and
   (b) adding a guard sample after said samples utilized on each video line of compressed audio, wherein said guard sample is equal in amplitude to a video gray level that is half-way between black and white.

3. The method of operating a television-compressed-audio sound system in which electrical amplitude variation samples that originally represented sound are raised in frequency and are altered to a video signal format, which includes the method step of:
   (a) adding a guard sample prior to the samples that are utilized on each video line of compressed audio to allow the amplitude of the signal to reach a steady state value by the time said samples are received and so avoid television-line-transient-produced spurious audio sounds, wherein said guard sample is equal in amplitude to the average of the last utilized sample on the preceding video line and the first utilized sample on the following video line.

4. The method for suppressing spurious audio frequency sounds in a television-compressed-audio sound system in which electrical amplitude variations that originally represented sound are raised in frequency and are altered to a video signal format, the method including the step of:
   (a) adding a guard sample after the audio samples that are utilized on each video line of compressed audio whereby spurious audio frequency sounds as a result of timing variations induced by reinserted sync signals are suppressed, the amplitude of the guard sample (i) being independent of the amplitude of at least one audio sample on the video line in which the guard sample is output, and (ii) being equal in amplitude to a gray level.

5. A television-compressed-audio system for suppressing spurious audio frequency sounds, the system comprising:
   means for sampling an audio frequency signal to produce a plurality of audio samples;
   means coupled to said sampling means for storing the audio samples; means for creating a guard sample equal in amplitude to a gray level; and
   means coupled to said storing means for outputting the guard sample and the audio samples at video frequency, the guard sample being output prior to the output of the audio samples in order to suppress spurious audio frequency sounds due to frequency response limitations.

6. A television-compressed-audio system for suppressing spurious audio frequency sounds, the system comprising:
   means for sampling an audio frequency signal to produce a plurality of audio samples;
   means coupled to said sampling means for storing the audio samples;
   means for creating a guard sample equal in amplitude to the average of the amplitudes of the last audio sample on the video line preceding the guard sample of the first audio sample on the video line in which the guard sample is output; and
   means coupled to said storing means for outputting the guard sample and the audio samples at video frequency, the guard sample being output prior to the output of the audio samples in order to suppress spurious audio frequency sounds due to frequency response limitations.

7. A television-compressed-audio system for suppressing spurious audio frequency sounds, the system comprising:
   means for sampling an audio frequency signal to produce a series of audio samples;
   means coupled to said sampling means for storing the audio samples;
   means for creating a guard sample equal in amplitude to a gray level, the amplitude of said guard sample being independent of the amplitude of at least one audio sample in the series; and
   means coupled to said storing means for outputting the guard sample and the audio samples at video frequency in order to suppress spurious audio frequency sounds.

* * * * *